May 18, 1937.　　　P. E. DUGGAN　　　2,080,659
FILM REELING AND DISPENSING MEANS FOR
CONTINUOUS MOTION PICTURE PROJECTORS
Filed March 20, 1935
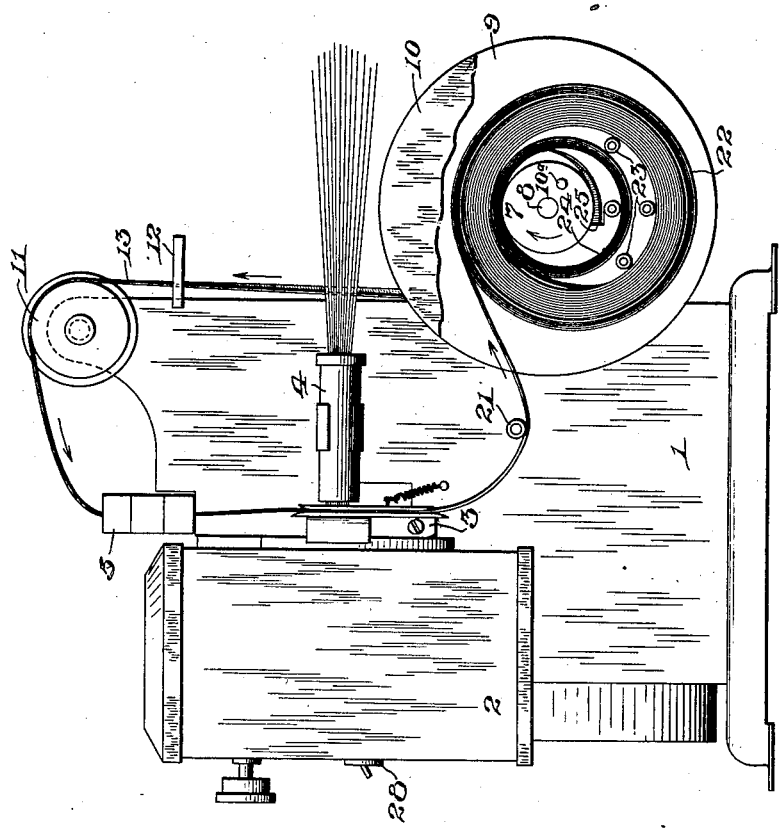
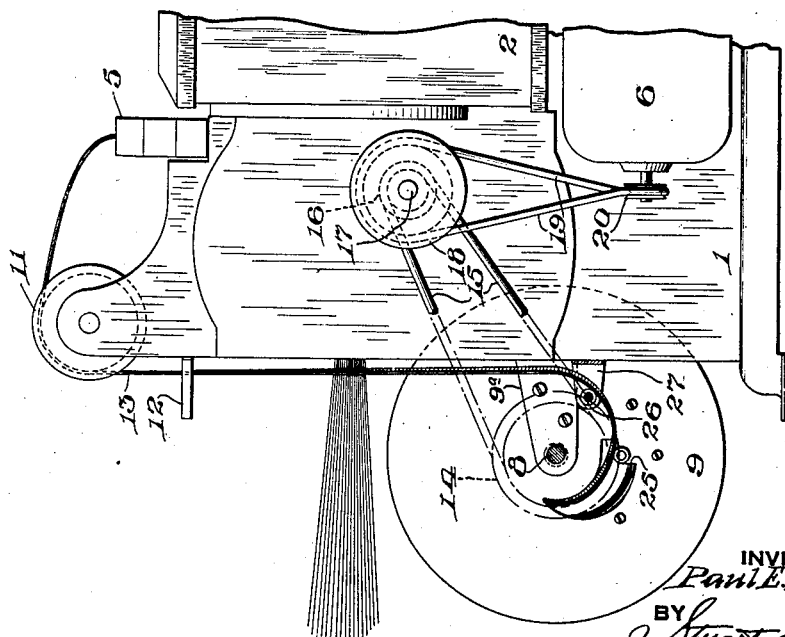
INVENTOR
Paul E. Duggan,
BY
ATTORNEY Patented May 18, 1937

2,080,659

UNITED STATES PATENT OFFICE 2,080,659

FILM REELING AND DISPENSING MEANS FOR CONTINUOUS MOTION PICTURE PROJECTORS

Paul E. Duggan, Philadelphia, Pa.

Application March 20, 1935, Serial No. 12,101

5 Claims. (Cl. 88—18.7)

The object of the invention is to provide improvements in motion picture projectors, and especially in that class which is so constructed as to be capable of an uninterrupted or continuous showing of an endless film strip, or at least until the showing is discontinued manually or at some predetermined point automatically.

Such devices have heretofore been characterized by the fact that, when the continuous or uninterrupted strip of film is wound upon and from a single spool or reel, difficulty has always been encountered with the film either breaking as the result of too much friction or binding, or else the film becomes loosened to such a degree that it becomes too slack and loops and becomes tangled outside of the reel, it being understood that the basic principle of movement of the film upon the reel involves the winding of the film always upon the outermost layer already in place, and withdrawing it from the innermost layer adjacent to the hub or spindle, or vice versa.

In perfecting the present invention, an object has been to provide a simple means whereby the friction between the reel and the film is such as to maintain a sufficiently positive take-up at all times in the film as it leaves the shutter mechanism, and yet to maintain a minimum of surplus friction, so that it can at all times be withdrawn freely from the radially inner portion of the reel.

A further and more specific object is to provide a mechanism of this character, which provides for running the several convolutions of the film in a plurality of groups in corresponding paths, said groups and paths being spaced apart throughout the major portion of their circumferential extent, and each path preferably being at least partially defined by anti-friction spacing and guiding means, the film being wound upon the radially outer surface of the outermost group of convolutions, and withdrawn from the innermost convolution of the radially innermost group.

With these objects in mind, the invention comprises further details of construction and operation, which are hereinafter fully brought out in the following description, when read in conjunction with the accompanying drawing, in which Fig. 1 is a right side elevation of a device comprising one embodiment of the invention with parts broken away; and Fig. 2 is a fragmentary portion of the left side elevation of the same, both being when viewed by the operator facing towards the usual screen in front of the device.

Referring to the drawing, any well known type of motion picture projector is illustrated as comprising a suitable casing 1, carrying the lamp housing 2, combined shutter and feed mechanism 3, adjustable lens holder 4, a film control mechanism 5, which may be either manually operated, or coin controlled, as in the case of the structure described in co-pending application Serial No. 666,677, filed April 18, 1933, now Patent 2,011,272, together with a suitable drive which may be either manual or in the form of an electric motor 6, and an improved spindle comprising in turn a central rotatable hub 7 carried upon a driving shaft 8, and also embodying laterally spaced discs or flanges 9 and 10, preferably of circular shape, said hub and discs cooperating to form a reel similar in many respects to the reels heretofore widely used, but differing in certain features as hereinafter pointed out. Among these features is the fact that the disc 9 is fixedly supported by the casing 1 thru the medium of a bracket 9ª, and is centrally apertured to slidably receive the shaft 8. The second disc 10 is then detachably secured to and rotatable with the hub 7 by virtue of the stud 10ª, said discs merely operating to maintain the film strip in its predetermined paths around said hub.

The uppermost portion of the casing 1 carries a rotatable idler or film guide 11, together if necessary with an auxiliary guide 12, to maintain the film 13 upon said idler when the latter is not of a grooved type. In this projector it will be noted that there is no provision for feeding or advancing the said film other than that of the feed mechanism 3, which is closely adjacent to the usual shutter (not shown in detail), and the hub-supporting shaft 8 which carries a pulley 14 and is rotated at the proper speed by means of a belt 15, extending from a smaller pulley 16 upon the feed-driving shaft 17, which also carries a relatively larger pulley 18, connected by a belt 19 to the driving pulley 20, carried in turn by the shaft of the motor 6, or otherwise operatively attached to the driving mechanism.

As hereinbefore stated, the film 13 has its initially opposite ends cemented together so as to provide a continuous film strip. Beginning at the auxiliary guide 12, said film strip passes over the idler guide 11, thence rearwardly and downwardly thru the current-control mechanism 5, and on downwardly past and into engagement with the shutter and feed mechanism 3, whence it preferably passes around an anti-friction guide 21, which prevents the film from leaving the feed mechanism 3 too abruptly, as it passes onwardly to the reel between the lateral discs or plates 9 and 10. Here said film passes into a group of parallel convolutions 22, which are eccentric with the axis of the shaft 8, and occupy a path defined by three anti-friction studs 23 carried by the fixed disc or plate 9, and also by the outermost surface of an inner group of convolutions 24, which occupy a circular path also eccentric with the shaft 3, but having a centre removed from the axis of said shaft a less distance, than is the centre of the corresponding circular path of the first group of convolutions 22. The film strip having passed from the first set of convolutions into and thru the group comprising the second set, leaves the radially innermost layer of the latter and smaller group, and thence passes diagonally outwardly from said reel thru the elongated aperture 25 in the reel plate or disc 9, whence said film strip passes around an external idler 26, carried by a suitable bracket 27, supported directly by the casing 1, and thence upwardly towards the auxiliary guide 12.

In this apparatus, it is to be understood that the ratio between the diameters of the film groups of convolutions 22 and 24, and that of the respective pulleys 14, 16, 18 and 20 are of such relative ratios that with a given speed of the motor 6, the film strip passes at the proper speed thru the combined shutter and feed mechanism 3, and elsewhere thru the film path hereinbefore described. As the hub 7 with its respective fixed and demountable discs or plates 9 and 10 rotates, the film 13 enters the said reel and under the impelling force of the rotatable hub 7 is carried a predetermined number of times around said hub in the outer path 22, after which said film enters and passes also a predetermined number of times thru the second path 24, after which it leaves the innermost portion of said second path and passes therefrom thru the aperture 25 and upwardly over the idler guide 11 and thru the control mechanism 5. With this construction, as long as the motor and lamp control switch 28 is properly set, the apparatus will continue to operate automatically without any attention whatever, and until the current for both the motor and light is shut off by means of the control mechanism 5, which may be either controlled manually or by means of a cut-out portion of the film strip itself encountering said mechanism, as for example such as is described in said co-pending application Serial No. 666,677.

It is to be noted that the film is wound upon the rotating hub 7 as the result of just the proper degree of friction between said hub and the several convolutions of the film strip in both of the groups 22 and 24, while this friction is maintained at a pre-determined degree and prevented from exceeding such definite degree by separating the several convolutions of the film into two paths, which are spaced-apart throughout the major portions of their circumferential extent by means of the anti-friction studs 23. Having provided a delicate balance or line of demarcation between too little and too much friction between the adjacent convolutions of film within said reel and between said convolutions and said hub, no difficulty is experienced by the feed mechanism 3 in pulling upwardly upon the film strip thru the medium of the intervening idler 11, and thereby extracting or withdrawing said film from the radially innermost portion of said reel as indicated in the drawing.

I am aware that the invention may be embodied in other specific forms without departing from the spirit or essential attributes thereof, and I therefore desire the present embodiment to be considered in all respects as illustrative and not descriptive, reference being had to the appended claims rather than to the foregoing description to indicate the scope of the invention.

Having thus described my invention what I claim as new and desire to secure by Letters Patent, is:—

1. In a motion picture projector for endless film, a reel comprising a vertically disposed fixed plate, a relatively large hub having a frictional driving surface on the periphery rotatable on a horizontal axis substantially centrally of the plate, an endless film having convolutions in a coil, rotatable means extending laterally from said plate beneath, substantially parallel to and in spaced relation to the said hub for separating the lower portions of the convolutions of the coil of film so as to travel in a plurality of paths, all of said convolutions being supported by the upper surface of said hub and being spaced from the lower surface of said hub, and means for driving the hub.

2. In a motion picture projector, an endless film, a rotatable hub, a relatively fixed vertical reel plate perpendicular to the axis of the hub operatively confining a coil of convolutions of said film in surrounding relation to said hub, said hub being of a size providing a peripheral frictional surface, means extending laterally from said reel plate beneath, substantially parallel to and in spaced relation to said hub for separating the lower portions of the convolutions of the coil of film so as to travel in a plurality of paths, all of said convolutions being supported by the upper surface of said hub and being spaced from the lower surface of said hub, and means for driving the hub.

3. In a motion picture projector according to claim 1, a plate secured to and rotating with the hub on the opposite side of the film to said fixed plate.

4. In a motion picture projector, a hub rotatable on a substantially horizontal axis, an endless film, a reel having a fixed vertical plate provided with means to operatively confine a coil of convolutions of said film in surrounding relation to said hub, said hub being within the innermost convolution and having a periphery engaging the latter and of a size to constitute a driving surface, means in the plate to guide the film from the hub means extending between the convolutions disposed laterally on the plate parallel to and in spaced relation to said hub for separating the lower portions of the convolutions of the coil of film so as to travel in a plurality of paths, all of said convolutions being supported by the upper surface of said hub and being spaced from the lower surface of said hub, and means for driving the hub.

5. In a motion picture projector according to claim 4, a plate secured to and rotating with the hub in spaced relation to said fixed plate and on the opposite side of the film.

PAUL E. DUGGAN.